(12) United States Patent
Ohki

(10) Patent No.: US 6,776,946 B2
(45) Date of Patent: Aug. 17, 2004

(54) METHOD AND APPARATUS FOR RUBBER EXTRUDING

(75) Inventor: Masahiko Ohki, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 09/989,390

(22) Filed: Nov. 21, 2001

(65) Prior Publication Data
US 2002/0063357 A1 May 30, 2002

(30) Foreign Application Priority Data
Nov. 22, 2000 (JP) ........................................ 2000-355991

(51) Int. Cl.$^7$ ............................................. B29C 47/00
(52) U.S. Cl. ............................. 264/177.1; 264/177.16; 425/199; 425/328.4
(58) Field of Search ......................... 264/177.1, 177.16; 425/197, 199, 328.4, 465

(56) References Cited

U.S. PATENT DOCUMENTS

| | | | |
|---|---|---|---|
| 2,566,854 A | | 9/1951 | Rhodes |
| 3,486,195 A | * | 12/1969 | Greenwood et al. ...... 425/131.1 |
| 3,584,343 A | * | 6/1971 | Kohlepp et al. ............ 425/130 |
| 3,609,806 A | * | 10/1971 | Schippers et al. .......... 425/197 |
| 3,830,610 A | * | 8/1974 | Ohkawa et al. ............. 425/141 |
| 3,850,568 A | * | 11/1974 | Bartha et al. ............... 425/466 |
| 4,088,433 A | * | 5/1978 | Simpson ..................... 425/464 |
| 4,439,125 A | | 3/1984 | Dieckmann et al. |
| 4,515,738 A | | 5/1985 | Anders |
| 4,556,382 A | | 12/1985 | Nadeau, Jr. et al. |
| 4,609,336 A | | 9/1986 | Stevenson et al. |
| 5,221,541 A | * | 6/1993 | Arbour et al. ............... 425/188 |
| 5,527,499 A | * | 6/1996 | Miley ......................... 264/40.1 |
| 6,294,119 B1 | * | 9/2001 | Nakamura ............. 264/173.12 |
| 6,478,564 B1 | * | 11/2002 | Tieu et al. ................... 425/145 |
| 6,491,510 B1 | * | 12/2002 | Tieu et al. ................... 425/145 |
| 2002/0086082 A1 | * | 7/2002 | Grossi ......................... 425/467 |
| 2002/0190417 A1 | * | 12/2002 | Helle et al. ................. 264/104 |

FOREIGN PATENT DOCUMENTS

| | | |
|---|---|---|
| EP | 0733457 A1 | 9/1996 |
| EP | 0835735 A1 | 4/1998 |
| WO | 99/38664 A1 | 8/1999 |

OTHER PUBLICATIONS

Hurez, P. et al., Polymer Engineering and Science, vol. 36, No. 5, pp. 626–635, (Mar. 15, 1996).

* cited by examiner

Primary Examiner—Mark Eashoo
(74) Attorney, Agent, or Firm—Birch, Stewart, Kolasch & Birch, LLP

(57) ABSTRACT

Increase or decrease in rubber extruding rate can be freely adjusted while keeping a sectional shape of a rubber extruded intermediate constant. A discharge port of a rubber flow path of a die plate is of a flat shape with a lower section and a higher section and with a height varying along a width direction. An extruding speed from the discharge port of the die plate is made uniform at positions along the width direction of said rubber extruded intermediate.

10 Claims, 10 Drawing Sheets height at the inflow port

METHOD AND APPARATUS FOR RUBBER
EXTRUDING

BACKGROUND OF THE INVENTION

The present invention relates to a rubber extruding method and a rubber extruding apparatus, capable of performing extruding of a rubber extruded intermediate having a thickness varying in the width direction with good precision.

In a case where a raw tire (green tire) is produced, for example, rubber extruded intermediates such as a sidewall rubber, a clinch rubber, a tread rubber and others are employed. Such rubber extruded intermediates are extruded from a rubber extruder having a die plate. In FIG. 10(A), a tread rubber "a" is illustrated as such a rubber extruded intermediate. In general, these rubber extruded intermediates "a" are each extruded as an article having a thickness varying in a width direction.

In extrusion, rubber flows with more of ease in a portion a1 having a larger thickness in the rubber extruded intermediate "a", as compared with a portion a2 having a smaller thickness therein. For this reason, a distribution vp of an extruding speed v, as shown in FIG. 10A, is profiled with a value different according to a portion like a sectional shape of the rubber extruded intermediate. That is, the extruding speed v is non-uniform in the width direction. Furthermore, if an extruding rate of an extruder varies, the extruding speed distribution vp loses more of balance thereof, easily accelerating non-uniformity in extruding speed to an greater extent. In such a case, there arises a problem that passage resistance of rubber passing through the die plate largely varies at positions along the width direction, thereby causing a sectional shape of a rubber extruded intermediate not to be constant.

SUMMARY OF THE INVENTION

The present invention has been contrived in light of the problems as described above and it is an object of the present invention to provide a rubber extruding method and a rubber extruding apparatus, working to maintain a sectional shape of a rubber extruded intermediate to be constant even in a case where an extruding rate of an extruder or the like varied.

According to the first present invention is a rubber extruding method extruding a rubber extruded intermediate by discharging rubber from a discharge port of a die plate mounted to an outlet of an extruder, wherein said die plate has an inflow port through which rubber flows in from the extruder side, said discharge port, and a rubber flow path connecting said inflow port and said discharge port therebetween, said discharge port is of a flat shape with a lower section having a smaller height and a higher section having a larger height and with a height varying along a width direction to thereby extrude said rubber extruded intermediate with a thickness varying along a width direction, and in addition each extruding speed of said rubber extruded intermediate is made uniform at positions along a width direction thereof.

According to the second present invention is a rubber extruding apparatus extruding a rubber extruded intermediate by discharging rubber from a discharge port of a die plate mounted to an outlet of an extruder, wherein said die plate has an inflow port through which rubber flows in from the extruder side, said discharge port, and a rubber flow path connecting said inflow port and said discharge port therebetween, said discharge port is of a flat shape with a lower section having a smaller height and a higher section having a larger height and with a height varying along a width direction to thereby extrude said rubber extruded intermediate with a thickness varying along a width direction, and said die plate satisfies the following relation:

$$(Ssi/Sso) > (Shi/Sho),$$

wherein Sso is an area per unit width in said lower section, Ssi is an area at said inflow port through which rubber flowing through said area Sso per unit width in said lower section passes, Sho is an area per unit width in said higher section and Shi is an area at said inflow port through which rubber flowing through said area Sho per unit width in said higher section passes.

BRIEF DESCRIPTION OF THE DRAWINGS

An embodiment of the present invention will now be described in detail in conjunction with the accompanying drawings.

DESCRIPTIOPN OF THE PREFERRED EMBODIMENTS

Figure 1:
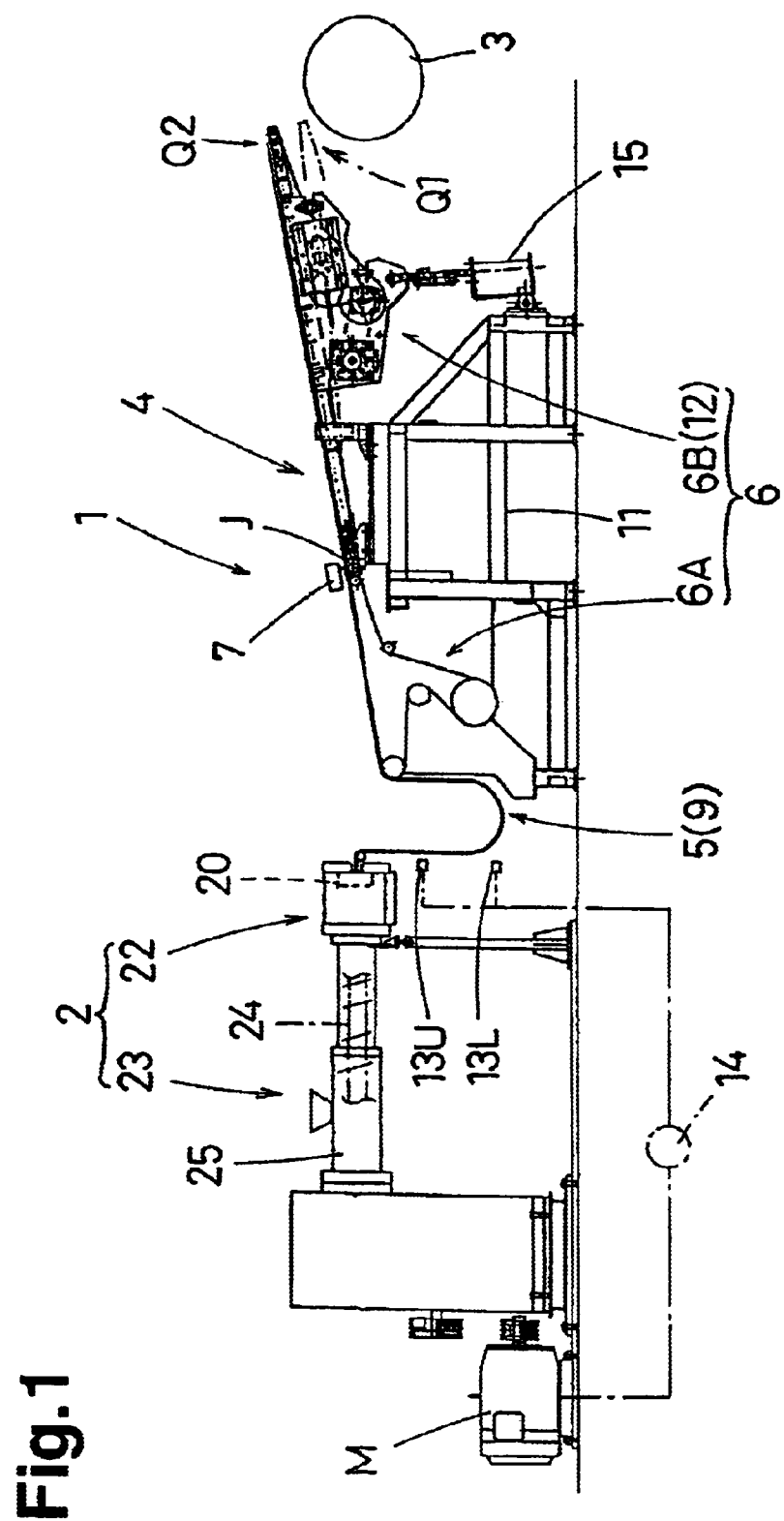
FIG. 1 is a perspective view showing one example of a rubber extruding apparatus relating to the present invention.
Figure 2A:
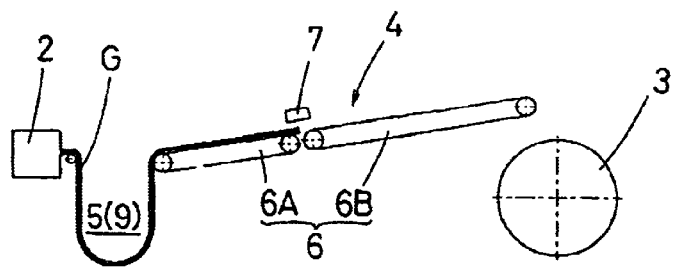
FIGS. 2A to 2E are diagrams showing accumulation states in an accumulator.
Figure 2B:
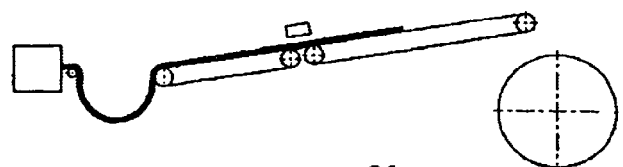
Figure 2C:
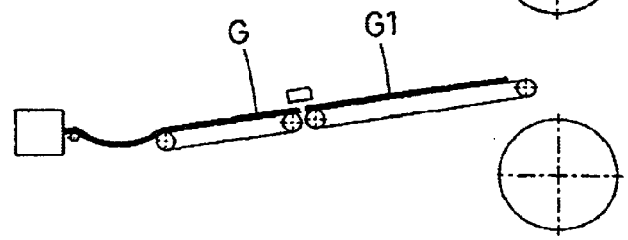
Figure 2D:
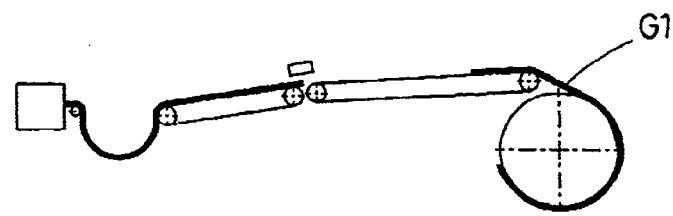
Figure 2E:
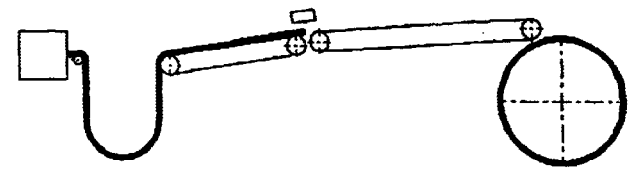

Description will be given of one embodiment based on the accompanying drawings below. In FIG. 1, a case is shown in which a rubber extruding apparatus 1 used in a rubber extruding method of the present invention is applied in a tread ring production line. In this tread ring production line, after a tread rubber is extruded as a rubber extruded intermediate G, the intermediate G is further forming into a tire preform such as a tread ring by directly fixing the intermediate G onto a forming drum.

The rubber extruding apparatus 1 comprises an extruder 2 and a feed means 4. The feed means 4 feeds the rubber extruded intermediate G continuously extruded from the extruder 2 to a folding drum 3 to form an annular tread ring. The feed means 4 is constituted of, for example, an accumulator 5, a fixing conveyor 6 and a cutting device 7. The folding drum 3 can reciprocate in the axial direction thereof in this example and shows a so-called belt drum capable of fixing parts such as a belt and a band at another position.

The accumulator 5 has an accumulation part 9 drooping the rubber extruded intermediate G extruded from the extruder 2 in a "U" shape for temporary accumulation. The extruder 2 is controlled on its screw rotation according to an accumulation amount in the accumulation part 9. In FIGS. 2A to 2(E), variations in accumulation amount are shown.

The fixing conveyor 6 is constituted of a first conveyor portion 6A receiving the rubber extruded intermediate G from the accumulator 5 for transportation, and a second conveyor portion 6B provided to the first conveyor 6A for free transit by way of the cutting device 7 and transporting cut intermediates G1 to the folding drum 3 for fixing.

The cutting device 7 has a cutting blade (not shown) such as an ultrasonic cutter, for example, and cuts the rubber extruded intermediate G transported by the first conveyor portion 6A into pieces with prescribed lengths (for example, a length required for fully winding each piece around the folding drum 3).

The first conveyor portion 6A can measure its transport distances and is controlled by a control means intermittently feeding the rubber extruded intermediate G by the prescribed length thereof at each time. Accordingly, the cut intermediates G1 each with the prescribed length are transported onto the second conveyor portion 6B.

The second conveyor portion 6B includes a conveyor body 12 supported in the upstream side thereof by a frame 11 freely rotatably about a pivotal point J. The conveyor body 12 is constituted of, for example, a belt conveyor and the top end of a rod of a cylinder 15 mounted on a side of the frame 11 is coupled with it. Therefore, by an extending or shrinking action of the rod, the conveyor body 12 swings about the pivotal point J upward or downward. With this swing action used, the conveyor body 12 can move between a lower position Q1 at which the distal end thereof is close to the forming drum 3 to fix the cut intermediate G1 and an upper position Q2 at which the distal end thereof is apart from the folding drum 3 for waiting.

The feed means 4 includes sensors 13U and 13L detecting the upper limit value and lower limit value of the accumulation amount in the accumulator 5, and a control means 14 controlling a rotation speed of a drive motor M (that is a rotation speed of a screw) of the extruder 2 based on a detection signal of the sensor 13U or 13L. Hence, the accumulation amount of the rubber extruded intermediate in the accumulator 5 is restricted within a prescribed range.

Figure 10A:
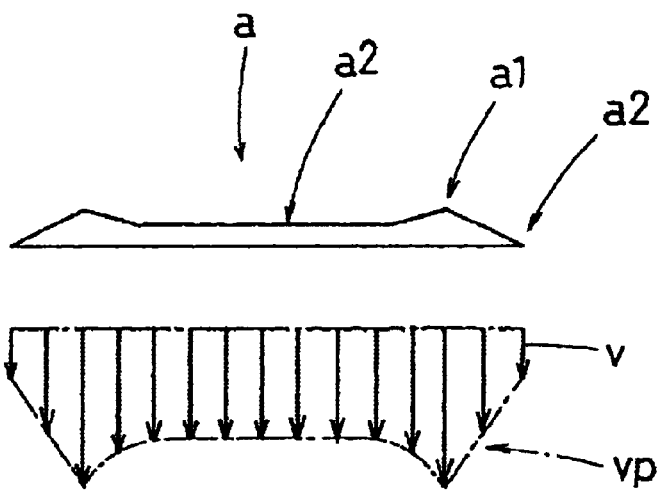
FIG. 10A is a diagram showing an extruding speed distribution in a prior art practice and FIG. 10B is a diagram showing an extruding speed distribution in the present invention.
Figure 10B:
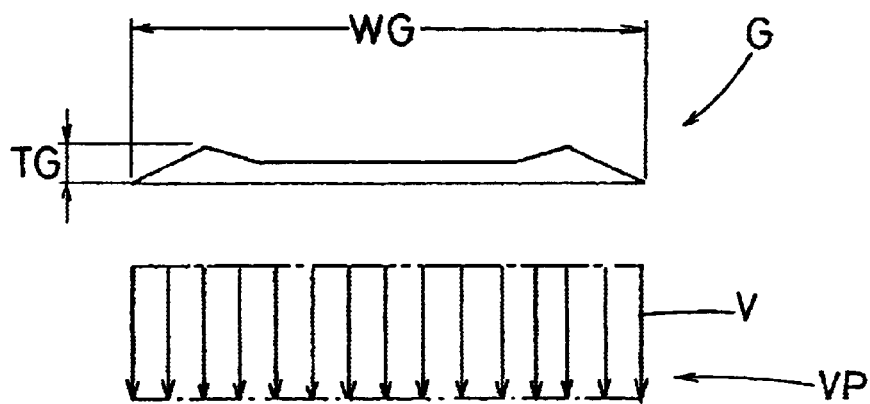

The extruder 2 can desirably perform extruding, maintaining a sectional shape of the rubber extruded intermediate G to be constant even if an extruding rate is varied by the rotation control. Therefore, in this embodiment, by giving a function for adjusting an extruding speed to the die plate 20, the extruding speed V, as shown in FIG. 10B, are made uniform at positions along the width direction of the rubber extruded intermediate G. The action of the extruding speed V to uniformity spreads a variation in a rubber extruding rate of the extruder, if any, uniformly across the entire intermediate in the width direction. As a result, a profile of the speed distribution VP does not lose a balance across a width. Hence, a sectional shape of the rubber extruded intermediate is kept constant.

The extruder 2, as in FIG. 1, comprises an extrusion head 22 and a main body 23 feeding rubber into the extrusion head 22. Furthermore, the die plate 20 is mounted to the outlet of the extrusion head 22.

The main body 23 comprises a cylinder 25 disposed a screw 24 therein. The screw 24 can be rotation-driven by a drive motor M to extrude charged rubber from an extrusion outlet 25A (shown in FIG. 3) at the fore end of the cylinder while kneading it. As the drive motor M, a motor capable of being controlled on a rotation speed thereof is preferably adopted. In this example, an inverter motor is used and a rotation speed thereof is freely adjusted by inverter control of the control means 14.

Figure 3:
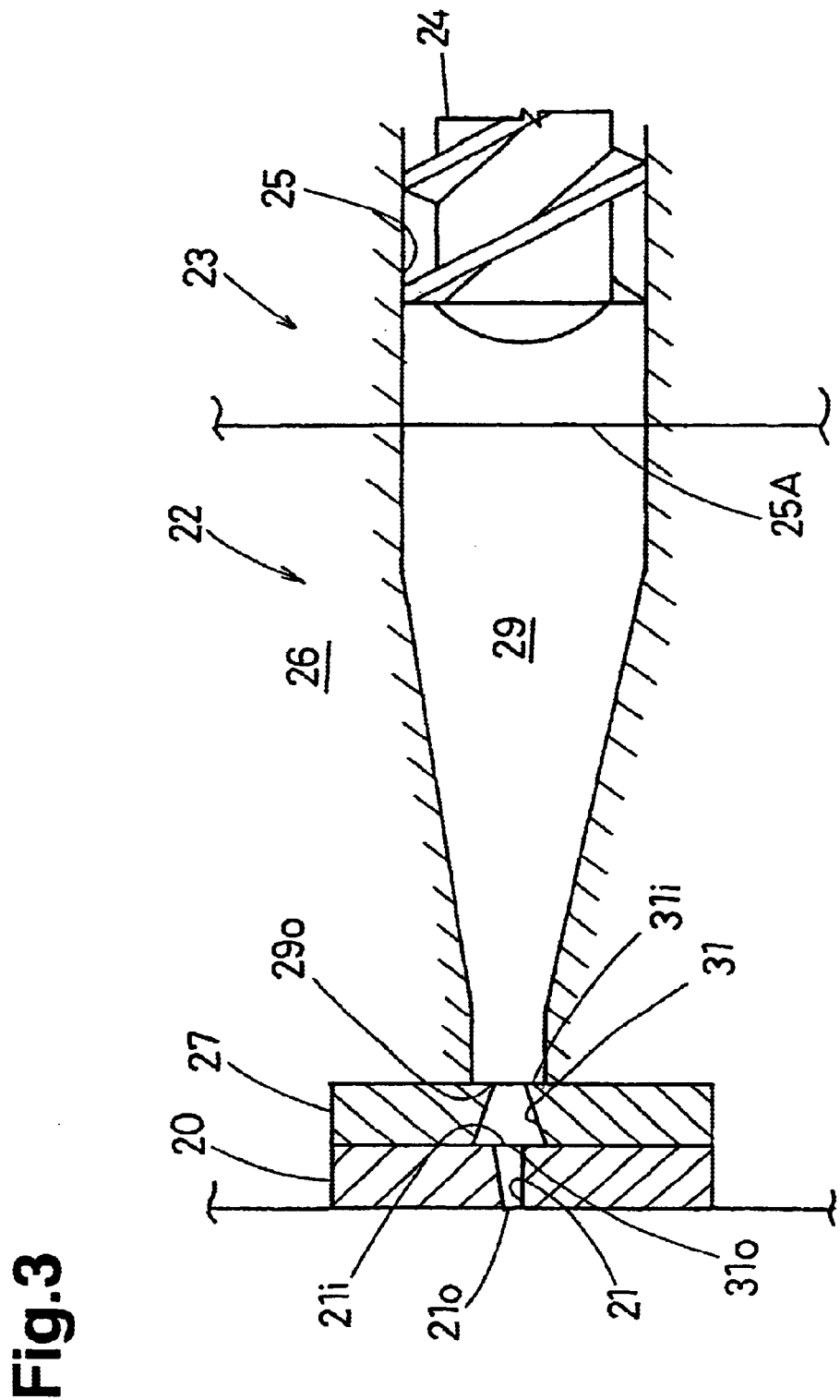
FIG. 3 is a sectional view describing a flow path in an extrusion head.

As shown in FIG. 3, in the extrusion head 22, the die plate 20 is exchangeably mounted to the fore end of a head body 26 in the shape of a block fixed to the cylinder 25. In this example, a preferable embodiment is shown in which a preformer 27 preliminarily forming rubber is disposed adjacent to the die plate 20 on the upstream side thereof.

Figure 4:
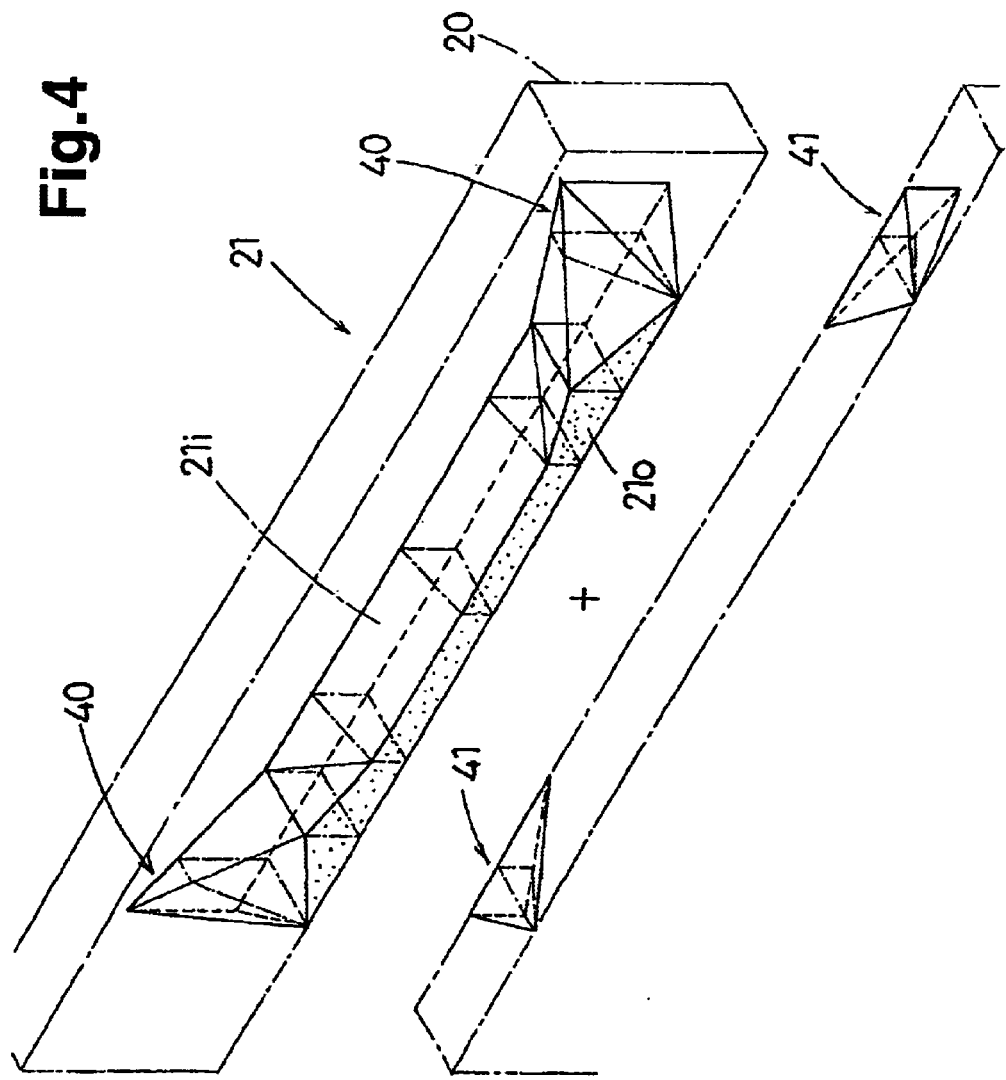
FIG. 4 is an exploded, perspective view showing a rubber flow path, divided into two parts, one on the other, in a die plate.
Figure 5:
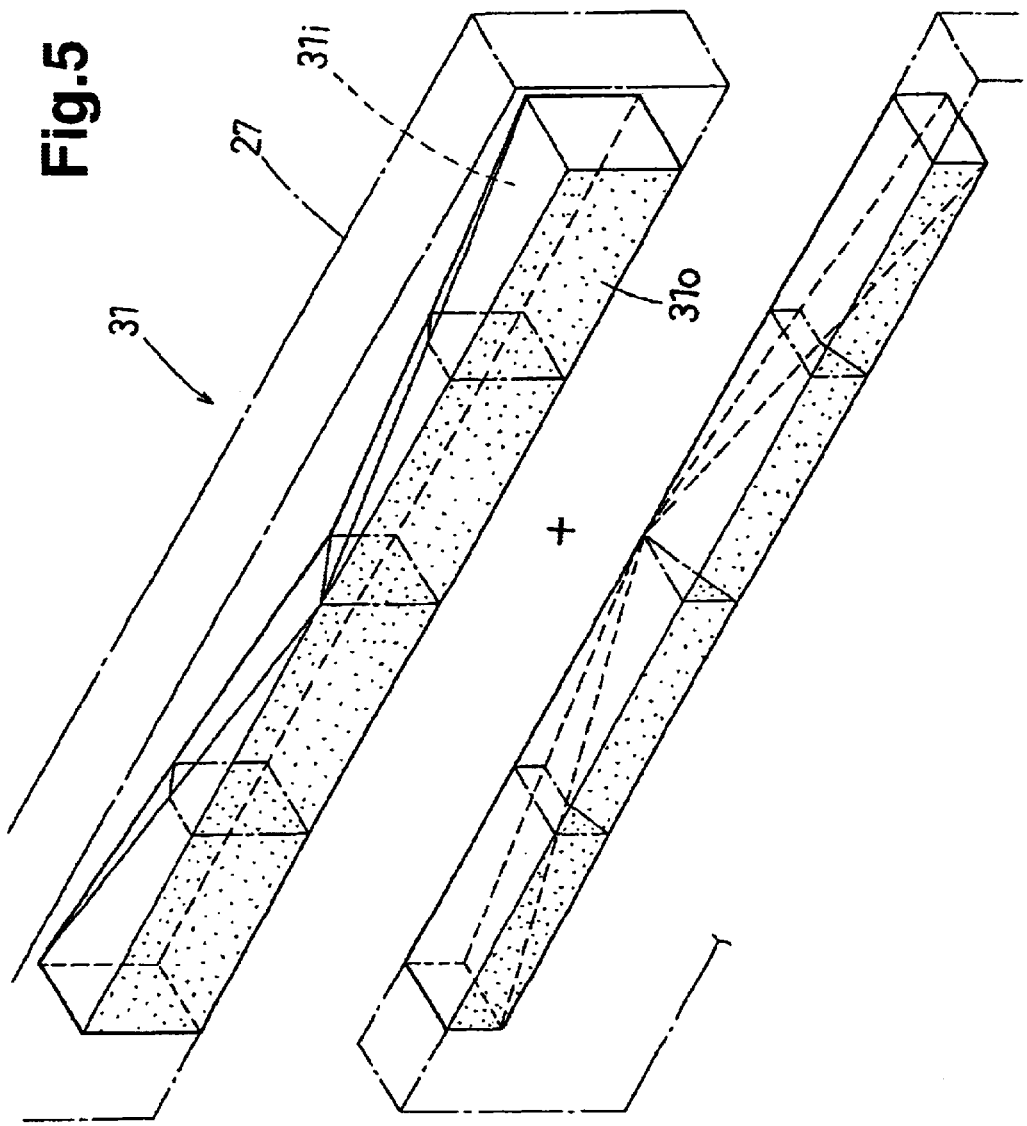
FIG. 5 is an exploded, perspective view showing an intermediate flow path, divided into two parts, one on the other, in a preformer.

The head body 26 has a guide flow path 29 guiding rubber from the cylinder 25 to the preformer 27. Furthermore, the preformer 27 has a receiving port 31$i$ receiving rubber from the guide flow path 29, a sending port 31$o$ feeding the rubber into the die plate 20 and an intermediate flow path 31 connecting the ports 31$i$ and 31$o$ therebetween. The die plate 20 has an inflow port 21$i$ through which the rubber from the intermediate flow path 31 flows in, a discharge port 21$o$ discharging the rubber, and a rubber flow path 21 connecting the ports 21$i$ and 21$o$ therebetween. In FIGS. 4 and 5, the rubber flow path 21 and the intermediate flow path 31 are shown in respective exploded view, each divided into two parts, one on the other.

Figure 6:
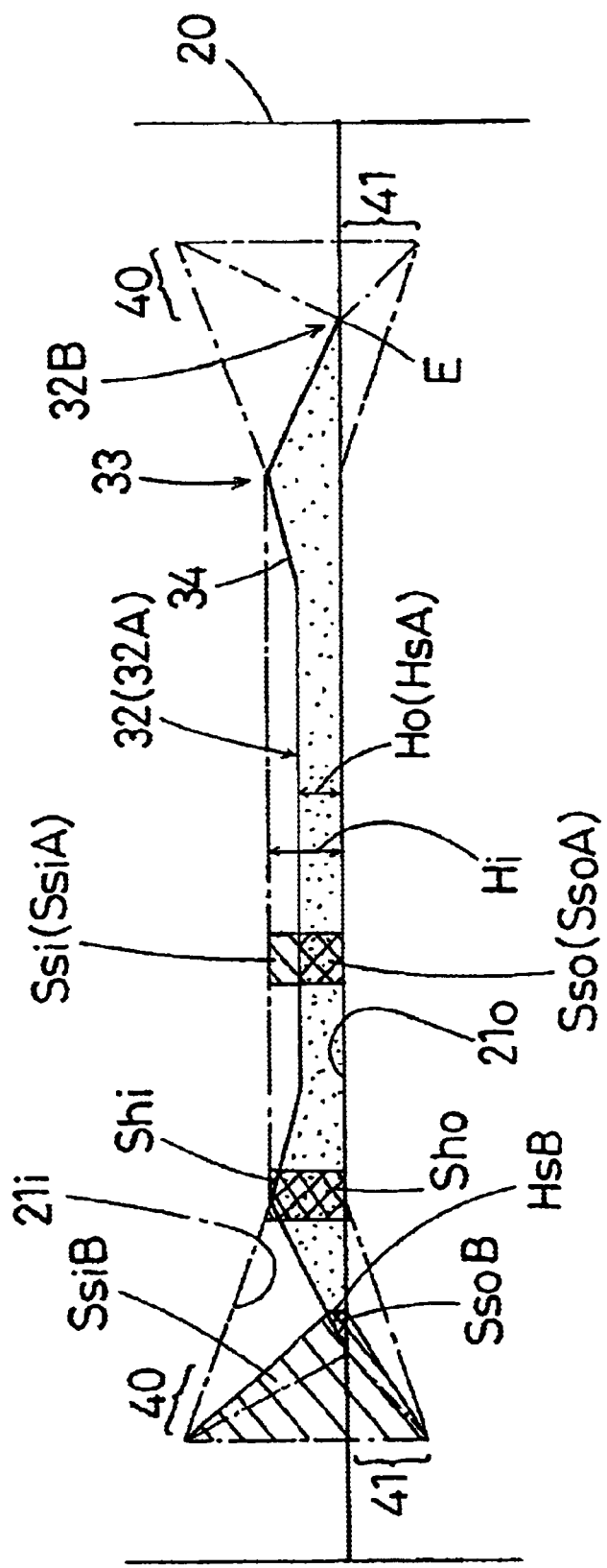
FIG. 6 is a diagram showing a discharge port and inflow port of the die plate together as viewed from the front side.

Herein, the discharge port 21$o$ of the die plate 20 is formed in an opening shape adapted to a desired rubber extruded intermediate G, similar to a prior practice. As shown in FIG. 6, the die plate 20 has a flat shape with a lower section 32 having a smaller height and higher sections 33 having a larger height. Thereby, the die plate 20 has a height Ho varying along the width direction. Such a die plate 20 can be used in extruding the rubber extruded intermediate G, determined by the opening shape of the die plate 20, and having a thickness varying along the width direction.

The discharge port 21$o$ comprises, in this example, the center lower section 32A of an constant height substantially located in the central portion, the higher sections 33 provided on both sides of the lower section 32A and inclined sections 34 located between the lower section 32A and the higher section 33. Moreover, the discharge port 21$o$ has an end lower section 32B, at least one end E, in a triangular shape formed by gradually decreasing a height of the section toward the end E. In this example, the discharge port 21$o$ is not only flat at the bottom edge, but of a bilaterally symmetrical shape with the end lower sections 32B formed at both ends thereof.

On the other hand, in order to achieve an extruding speed V in uniformity, it is set that the inflow port 21$i$ has a ratio (Ssi/Sso) of an area Sso per unit width in the lower section 32 at the discharge port 21$o$ and an area Ssi at the inflow port 21$i$ through which rubber flowing through the area Sso passes is larger than a ratio (Shi/Sho) of an area Sho per unit width in the higher section 33 at the discharge port 21$o$ and an area Shi at the inflow port 21$i$ through which rubber flowing through the area Sho passes. That is, the inflow port 21i is formed such that the following relation is satisfied:

$$(Ssi/Sso) > (Shi/Sho).$$

In addition, it is suitable that value of the ratio (Ssi/Sso) is 1.0 or more. Note that as in this example, in a case where lower sections with a plurality of heights (for example, 2) 32A and 32B are present and if heights HsA and HsB satisfy in the following relation:

$$HsA > HsB,$$

the inflow port 21i is formed such that area ratios of the sections 32A and 32B, (SsiA/SsoA) and (SsiB/SsoB) satisfy the following relation, which is the inversion, in inequality, of the above case:

$$(SsiA/SsoA) < (SsiB/SsoB).$$

In such a way, an area at the inflow port 21i is designed relatively smaller in corresponding section to the higher section 33 with a large height Ho, through which rubber is easy to flow at the discharge port 21o. On the contrary, an area at the inflow port 21i is designed relative larger in a corresponding section of the lower section 32 through which rubber is hard to flow at the discharge port 21o. Thereby, an extruding speed V of rubber (average speed of the rubber which passes the die plate 20) is put into balance, thereby enabling the extruding speed V to be uniform at positions along the width direction of the rubber extruded intermediate G.

Figure 7A:
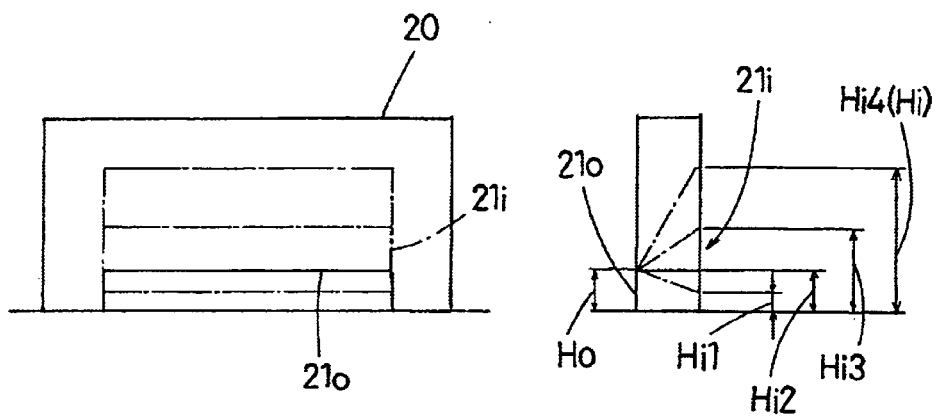
FIGS. 7A and 7B are a descriptive diagram of a die plate for use in a test and a graph showing test results, respectively.
Figure 7B:
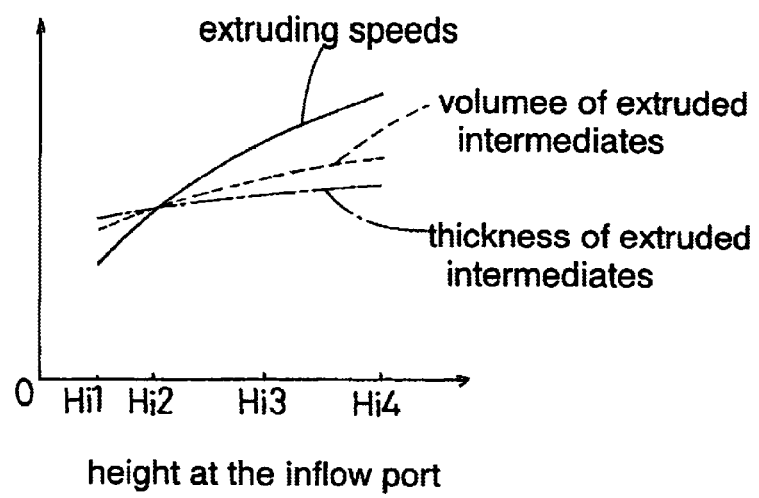

The inventors of the present invention performed an extrusion test as shown in FIG. 7A in conditions that in the die plate 20, a height Ho at the discharge port 21o is constant, while a height Hi at the inflow port 21i is varied and a pressure is constant. In the test, extruding speeds, volumes of extruded intermediates and thickness values of the extruded intermediates were compared. Results of the test are shown in FIG. 7B. As seen from the figure, as a ratio (Hi/Ho) of a height of the inflow port 21i to that of the discharge port 21o or an area ratio (Si/So) increases, an extruding speed, a volume of a extruded intermediate and a thickness of the extruded intermediate all increase individually. However, a degree of variation in extruding speed greatly varies, while degrees of variation in volume of the extruded intermediate and in thickness of the extruded intermediate are restricted to be small.

Therefore, by setting the area ratio (Shi/Sho) in the higher section 33 to a smaller value, while setting the area ratio (Ssi/Sso) in the lower section 32 to be a larger value, uniformity in the extruding speed of rubber can be realized. Moreover, since variations in volume and thickness of a extruded intermediate are very small, the discharge port 21o can be formed in conformity with a shape of a rubber extruded intermediate G, similar to a prior art practice.

In the end lower section 32B, there is a tendency that rubber is especially hard to flow to thereby reduce an extruding speed. Accordingly, there arises a necessity for setting an area Ssi at the inflow port 21i to a larger value. For that reason, as shown in FIG. 6, for example, a protruding sections 40 protruding outwardly in the width direction from the ends E of the discharge port 21o are formed at the inflow port 21i, correspondingly to the end lower section 32B. With this, a speed of rubber that flows into the end lower section 32B in the vicinity of the inflow port 211 can be increased. Moreover, in this example, scooped parts 41 having a depth decreasing toward the end lower section 32B from the inflow port 21i are formed on the bottom surface of the rubber flow path 21 for the same purpose, thereby ensuring an area Ssi and realizing smoothness of a rubber flow.

Then, the intermediate flow path 31 of the preformer 27 exerts a function to realize a sufficient and smooth rubber flow into the protruding section 40 and the scooped section 41. The intermediate flow path 31 is formed substantially larger in size than the rubber flow path 21 of the die plate 20.

Figure 8:
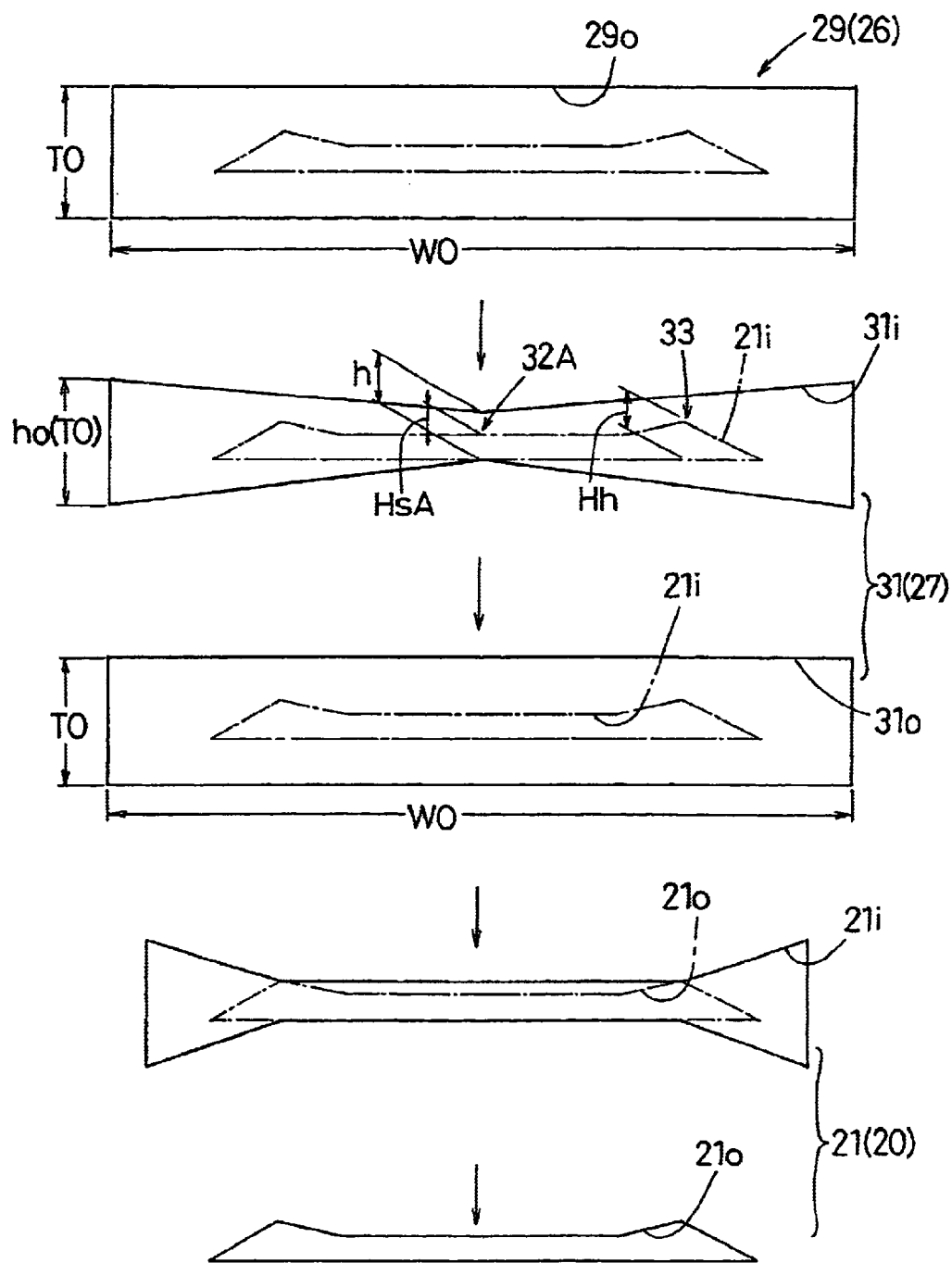
FIG. 8 is diagrams showing variations in shape of inlets and outlets of respective various flow paths in the order in which rubber flows through the inlets and outlets.

FIG. 8 shows a shape of an outlet 29o of the head body 26 (the guide flow path 29), shapes of the receiving port 31i and sending port 31o of the preformer 27 (the intermediate flow path 31) and shapes of the inflow port 21i and discharge port 21o of the die plate 20 (the rubber flow path 21) in the order in which rubber flows through the outlet and ports.

As shown in the figure, a shape of the sending port 31o of the preformer 27 is substantially the same as the outlet 29o of the head body 26. A width WO of the sending port 31o and a width WG of the rubber extruded intermediate G (shown in FIG. 10B) desirably satisfies the following relation:

$$WG(mm) + 20(mm) \leq WO(mm) \leq 3 \times WG(mm).$$

Moreover, a height T0 of the sending port 31o and a thickness TG of the rubber extruded intermediate G (shown in FIG. 10B) desirably satisfies the following relation:

$$TG(mm) + 5(mm) \leq T0(mm) \leq 3 \times TG(mm).$$

The receiving port 31i of the preformer 27 is formed according to a shape of the discharge port 21o of the die plate 20. For example, in a case where the discharge port 21o has the lower section 32A in the center portion and the higher sections 33 on both sides of the lower section 32A, and a height ratio (HsA/Hh) is 0.8 or less, a shape of the receiving port 31i is made close to a shape of the discharge port 21o. To be detailed, it is desirable to form a shape that a height h is gradually increased from the center portion toward the both ends by reducing a height in the center section of the receiving port 31i. At this time, heights h0 (the maximum heights) at the both ends are best set so as be equal to a height T0 at the sending port 31o.

Figure 9:
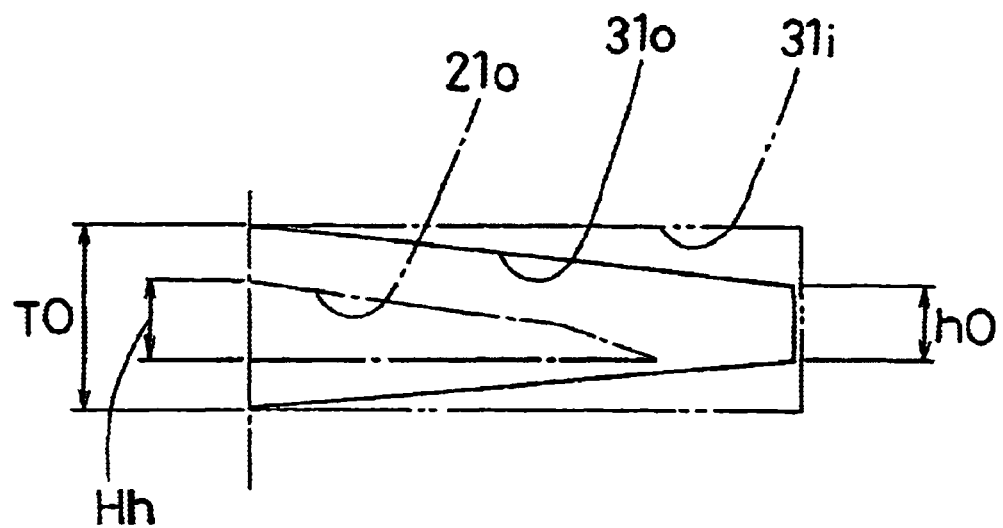
FIG. 9 is a diagram showing illustrating the other of the geometrical relationship between a receiving port of the preformer and a discharge port of the die plate.

Furthermore, as shown in FIG. 9, in a case where the discharge port 21o has the higher section 33 in the center portion and the lower sections 32 on both sides thereof, and a height ratio (HsA/Hh) is 1/1.5 or less, a shape of the receiving port 31i is made close to a shape of the discharge port 21o. At this time, it is desirable to form a shape that a height h is gradually increased from both ends toward the center portion by reducing heights at both ends of the receiving port 31i. Furthermore, a height h0 (the maximum height) at the central portion are set so as be equal to a height T0 at the taking-out port 31o.

In cases other than a case where the discharge port 21o is in the above conditions, a shape of the receiving port 31i can be substantially the same as that of the sending port 31o (in this example, a rectangular shape). In other words, a function as the preformer 27 can be lost to nothing. This is equal to non-use of the preformer 27.

In the above description, while detailed description is given of the especially preferred embodiment of the present invention, the present invention is not limited to a tread rubber, but can be adopted in extrusion of various other rubber extruded intermediates each having a thickness varying along the width direction. Furthermore, the present invention can be carried out in embodiments in various ways of modification or alteration according to a shape of a molded intermediate.

As described above, according to the present invention, in a case where a rubber extruded intermediate having a thickness varying along the width direction is extrusion-molded, an extruding speed can be made uniform at positions along in the width direction; therefore, a sectional shape of the rubber extruded intermediate can be kept constant even if a rubber extruding rate of an extruding machine changes. Accordingly, for example, a production line in which the extruding machine is directly coupled with a molding drum can be operated. Since such a production line can employ a small size extruding machine and is further operable excluding a temporary storage of the rubber extruded intermediate, thereby enabling a floor space to be saved and also improving productivity.

What is claimed is:

1. A rubber extruding method extruding a rubber extruded intermediate by discharging rubber from a discharge port of a die plate mounted to an outlet of an extruder, wherein said die plate has an inflow port through which rubber flows in from the extruder side, said discharge port, and a rubber flow path connecting said inflow port and said discharge port therebetween, wherein said discharge port is of a flat shape with a lower section having a smaller height and a higher section having a larger height and with a height varying along a width direction to thereby extrude said rubber extruded intermediate with a thickness varying along a width direction, in addition each extruding speed of said rubber extruded intermediate is made uniform at positions along a width direction thereof; and said die plate satisfies the following relation:

$$(Ssi/Sso) > (Shi/Sho)$$

wherein Sso in the relation is an area per unit width in said lower section,

Ssi is an area at said inflow port through which rubber flowing through said area Sso per unit width in said lower section passes, Sho is an area per unit width in said higher section, and Shi is an area at said inflow port through which rubber flowing through said area Sho per unit width in said higher section passes.

2. The rubber extruding method according to claim 1, wherein said lower section comprises an end lower section at least at one end in a width direction, in a triangular shape formed by gradually decreasing its height toward said one end, and said inflow port has at least one protruding section protruding outwardly in the width direction from the one end of said discharge port.

3. The rubber extruding method according to claim 2, wherein said rubber flow path has at least one scooped part scooped out a surface thereof lower than a bottom edge of said discharging port, said scooped part has a depth decreasing toward said discharging port side from inflow port side.

4. The rubber extruding method according to claim 1, wherein a preformer is disposed adjacent to said die plate on the upstream side thereof, said preformer has a receiving port receiving rubber from said extruder, a sending port feeding the rubber into said inflow port of said die plate and an intermediate flow path connecting said receiving port and said sending port therebetween, and a shape of said receiving port is close to a shape of said discharge port of said die plate.

5. The rubber extruding method according to claim 1, wherein said rubber extruded intermediate is a tread rubber for a tire.

6. A rubber extruding apparatus extruding a rubber extruded intermediate by discharging rubber from a discharge port of a die plate mounted to an outlet of an extruder, wherein said die plate has an inflow port through which rubber flows in from the extruder side, said discharge port, and a rubber flow path connecting said inflow port and said discharge port therebetween, said discharge port is of a flat shape with a lower section having a smaller height and a higher section having a larger height and with a height varying along a width direction to thereby extrude said rubber extruded intermediate with a thickness varying along a width direction, and said die plate satisfies the following relation:

$$(Ssi/Sso) > (Shi/Sho),$$

wherein Sso is an area per unit width in said lower section, Ssi is an area at said inflow port through which rubber flowing through said area Sso per unit width in said lower section passes, Sho is an area per unit width in said higher section and Shi is an area at said inflow port through which rubber flowing through said area Sho per unit width in said higher section passes.

7. The rubber extruding apparatus according to claim 6, wherein each extruding speed of said rubber extruded intermediate is made uniform at positions along a width direction thereof.

8. The rubber extruding apparatus according to claim 7, wherein said rubber flow path has at least one scooped part scooped out a surface thereof lower than a bottom edge of said discharging port, said scooped part has a depth decreasing toward said discharging port side from inflow port side.

9. The rubber extruding apparatus according to claim 6, wherein a preformer is disposed adjacent to said die plate on the upstream side thereof, said preformer has a receiving port receiving rubber from said extruder, a sending port feeding the rubber into said inflow port of said die plate and an intermediate flow path connecting said receiving port and said sending port therebetween, and a shape of said receiving port is close to a shape of said discharge port of said die plate.

10. The rubber extruding apparatus according to claim 6, wherein said rubber extruded intermediate is a tread rubber for a tire.

* * * * *